United States Patent [19]

Caldwell

[11] 4,383,308
[45] May 10, 1983

[54] ACOUSTIC WELL LOGGING DEVICE FOR DETECTING SHEAR AND COMPRESSIONAL WAVES

[75] Inventor: Richard L. Caldwell, Dallas, Tex.

[73] Assignee: Mobil Oil Corporation, New York, N.Y.

[21] Appl. No.: 220,921

[22] Filed: Dec. 29, 1980

[51] Int. Cl.³ .......................... G01V 1/40; G01V 1/16
[52] U.S. Cl. ...................................... 367/31; 367/27; 181/103
[58] Field of Search ....................... 367/31, 34, 35, 26, 367/27, 75, 911; 181/104–106, 103

[56] References Cited

U.S. PATENT DOCUMENTS

| | | | |
|---|---|---|---|
| 3,208,549 | 9/1965 | Alexander et al. | 367/75 |
| 3,330,375 | 7/1967 | White | 367/75 |
| 3,333,238 | 7/1967 | Caldwell | 340/860 |
| 3,363,719 | 1/1978 | Venghiattis | 367/911 |
| 3,375,897 | 4/1968 | Engle et al. | 367/27 |
| 3,378,096 | 4/1968 | Cherry | 367/75 |
| 3,775,739 | 11/1973 | Vogel | 367/75 |
| 4,038,631 | 7/1977 | Murphy | 181/104 |
| 4,105,993 | 8/1978 | Grassy et al. | 367/27 |
| 4,207,961 | 6/1980 | Kitsunezaki | 181/106 |
| 4,293,934 | 10/1981 | Heraly | 367/31 |

FOREIGN PATENT DOCUMENTS

| | | | |
|---|---|---|---|
| 2321709 | 7/1976 | France | 367/75 |
| 384086 | 5/1973 | U.S.S.R. | 367/75 |
| 656011 | 11/1976 | U.S.S.R. | 367/27 |

OTHER PUBLICATIONS

Johnson, "Detection... Compressional and Shear Velocities", p. 158, *Geophysics*, vol. 42, #1, 2/77, QE500/G4.

*Primary Examiner*—Nelson Moskowitz
*Attorney, Agent, or Firm*—Charles A. Huggett; Michael G. Gilman; George W. Hager

[57] ABSTRACT

Novel acoustic logging tools are disclosed for logging unconsolidated formations. These tools include point force shear wave, and multidirectional compressional wave transmitters. A plurality of receivers with sensitivities matched to these transmitter types are provided for selectively gathering P wave and S wave information. The transmitters and receivers are located, sequenced and gated to ensure that high quality wave data is rapidly and reliably collected.

18 Claims, 2 Drawing Figures

ACOUSTIC WELL LOGGING DEVICE FOR DETECTING SHEAR AND COMPRESSIONAL WAVES

RELATED PATENT APPLICATIONS

The present application is related to U.S. patent application Ser. No. 106,076, filed Dec. 20, 1979 entitled "Shear Wave Acoustic Logging System" (Angona and Zemanek, Jr.), which application is assigned to the assignee of the present application and is specifically incorporated by reference as if fully set forth herein.

BACKGROUND

It has long been known to acoustically log open wellbores to determine the velocities of compressional ("P") waves and shear ("S") waves travelling through rock formations located in the wellbore region. Logging devices have been used for this purpose which normally comprise a sound source (transmitter) and one or more receivers disposed at pre-selected distances from the sound source. For example, Kitsunezaki has suggested one such device for use in shear wave logging wherein the transmitter is located 3.2 meters from the first of 5 receivers, which are spaced 1 meter apart down an elastic rubber tube which is intended to acoustically isolate these elements from each other. See "A New Method for Shear Wave Logging", by Choro Kitsunezaki, Oyo Technical Note RP-4101, Oyo Corporation, Urawa Saitama 336 Japan (October, 1978).

By timing the travel of compressional waves, shear waves, and/or tube waves between the transmitter and each receiver, it is normally possible to determine the nature of surrounding rock formations. In logging loosely consolidated formations, however, it is often difficult to distinguish between compressional, shear, tube and secondary waves which may comprise portions of a wave train arriving at a given receiver. The use of remotely spaced, multiple receivers is thus intended to aid in distinguishing between arriving wave fronts and from noise in the system. Multiple receivers permit the recognition of similar wave patterns and wave fronts which are received at each successive receiver. Since travel time differentials increase with increasing distance from the transmitter source, wave fronts and patterns which are closely spaced at proximate receiver locations will separate by the time of their receipt at remote receiver locations.

Various signal timing and wave front analysis methods have also been suggested for distinguishing between wave fronts received at a given receiver. Most of these methods involve timing circuits which anticipate the receipt of, and facilitate the collection of, such wave front information. For descriptions of various logging techniques for collecting and analyzing compressional wave, shear wave, tube wave, and secondary wave data, please refer to U.S. Pat. No. 3,333,238 (Caldwell), 3,362,011 (Zemanek, Jr.), and U.S. Reissue No. 24,446 (Summers).

In the design of logging tools, various types of transmitters, such as, piezoelectric or magnetostrictive transmitters, have been suggested for creating acoustic logging signals. For conventional logging operations, most such transmitters have been centrally located in the borehole, and have been adapted to generate sound which is radiated in a multidirectional (360°) pattern from the transmitter to adjacent wellbore surfaces. Such transmitters are well suited for creating compressional waves in surrounding rock and sand formations.

Since compressional waves travel faster than those shear, tube or secondary waves which may also be produced by a multidirectional transmitter, calculation of compressional wave velocity is accomplished by presuming that the first arriving wave front or wave pattern is that of a compressional wave. In loosely consolidated formations, subsequent arrivals of shear waves, tube waves and/or secondary waves are difficult to distinguish. In such formations, multidirectional transmitters tend to generate compressional waves of much greater amplitudes than any shear waves also produced thereby. Recognition of shear wave arrivals, is thus particularly difficult.

Recently, attention has been directed to developing transmitters which are particularly suited to shear wave logging. Such transmitters generally attempt to achieve a single point source application of sound energy to the borehole wall. The theory behind point source transmitters, as generally outlined in the above-mentioned Kitsunezaki paper, is that they are capable of directly generating S waves. Conventional multidirectional transmitters are said to be capable only of indirectly creating shear waves. Accordingly, point source type transmitters produce shear waves of substantially higher amplitudes than heretofore possible with conventional multidirectional P wave transmitters. Accordingly, formations, such as loosely consolidated or unconsolidated sand, which do not propagate shear waves in sufficient amplitudes to permit definitive detection using conventional P wave receivers, may now be shear wave logged with these S wave logging systems. Oyo Technical Notes RP-4105, entitled "Development of a Suspension Type S-Wave Log System," By Kimio Ogura (November 1979) and RP-4125, entitled "Development of the Suspension S-Wave Logging System (Report No. 2)", by Kimio Ogura, et al (November 1980) provide additional information relating to S-wave logging systems.

In spite of the above described developments in logging techniques and apparatus, difficulty is nonetheless encountered in logging open boreholes, particularly those boreholes disposed through unconsolidated or loosely consolidated formations, such as sandstone or sand. In order to obtain the best possible logging data, it is important to log boreholes as soon as drilling is completed. Drilling mud has a tendency to damage the logging characteristics of an open borehole, and may interfere with the gathering of reliable logging data if time is permitted to elapse between the completion of drilling and the logging operation. Not only is rig time extremely costly (currently on the order of $50,000 to $100,000 per day) but there are inherent dangers in prolonging any logging operation. For example, many boreholes will not stay open for extended periods of time. It is thus important to expedite the logging operation to obviate any necessity to reinsert pipe into the borehole to flush with mud. Accordingly, a need exists with loosely consolidated formations to obtain all data which may be collected through the use of both conventional and shear wave logging apparatus, and to do so in a manner which permits the efficient, reliable collection of such data from an open, recently drilled borehole.

SUMMARY OF THE INVENTION

The present invention provides a plurality of improved logging tools for logging unconsolidated or loosely consolidated formations. Each of these tools is provided with a plurality of acoustic transmitters. One of these transmitters is a transmitter of the point source type which is particularly suited to generating shear waves in loosely consolidated formations. The other transmitter is a multi-directional, center-hole, acoustic transmitter which is well suited for generating compressional waves. In the preferred embodiment tool, a plurality of receivers are provided which are spaced apart from each of the transmitters at selected intervals along an acoustically isolating logging conduit. At least one, preferably two, of these receivers are relatively more sensitive to shear waves produced by the point source type transmitter, and are located closest to this transmitter. The remaining receivers are relatively more sensitive to compressional waves produced from the multidirectional transmitter. This juxtaposition of transmitters and receivers takes advantage of the differing travel times of shear and compressional waves to permit rapid cycling of the device to collect optimal amounts of logging information. In the preferred embodiment, cycle speed is increased by alternatively energizing each transmitter in response to the receipt of a suitable signal at the alternate wave-type receiver.

An alternate embodiment tool is also disclosed which is intended for use under conditions when increased acoustic isolation within the logging tool is desired. In this configuration, the multidirectional compressional wave transmitter is disposed between the compressional wave receivers and the shear wave receivers. In this embodiment, all the shear wave receivers are disposed closer to the compressional wave transmitter than is the closest compressional wave receiver to that transmitter. In this manner, receipt of a compressional wave by the closest compressional wave receiver will ensure that the compressional waves generated by the compressional wave transmitter have passed by the shear wave receivers prior to onset of their duty cycles.

Accordingly, a primary object of the present invention is the provision of novel logging tools for logging shear and compressional waves in unconsolidated or loosely consolidated formations.

A further object of the present invention is the provision of such a logging tool in which a plurality of differing types of transmitters are sequenced in rapid succession.

Another object of the present invention is the provision of a method for substantially simultaneously collecting shear and compressional wave data from an open borehole disposed through a loosely consolidated or unconsolidated formation.

These, and other objects of the present invention will become apparent from the following more detailed description.

DESCRIPTION OF THE PREFERRED EMBODIMENTS

While specific examples have been selected for the purpose of illustration in connection with the following description, one of ordinary skill in this art will recognize that departures may be made from the techniques and apparatus disclosed herein without departing from the scope of the present invention, which is defined more particularly in the appended claims.

Figure 1:
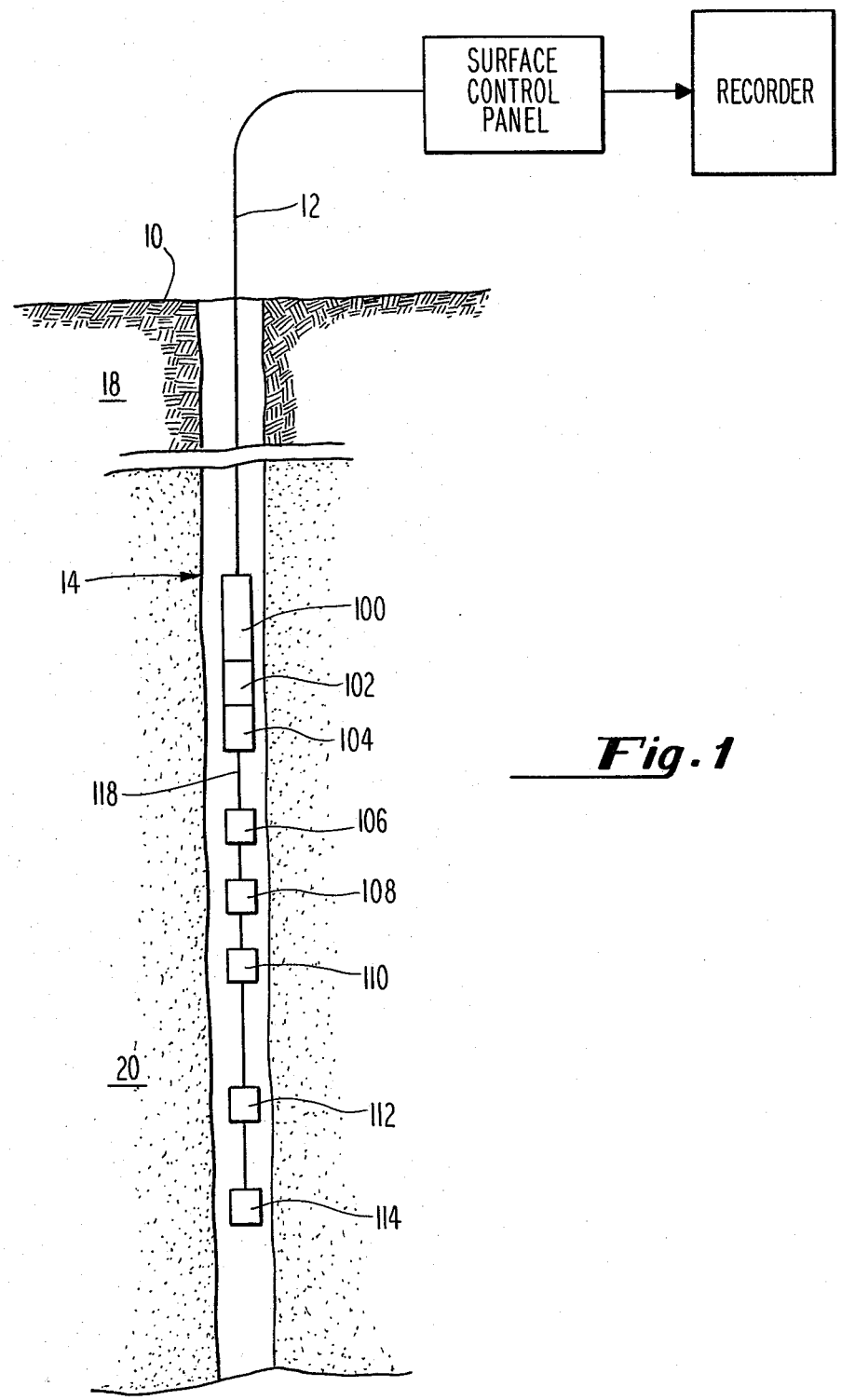
FIG. 1 is a diagramatic illustration of the preferred embodiment well logging apparatus disposed within a borehole in an unconsolidated sand, which shows the preferred relative positions of the shear and compressional transmitters and receivers of that apparatus.

Referring to FIG. 1, a preferred embodiment logging device is illustrated which is shown disposed in an open borehole. This borehole, which has been foreshortened for purposes of illustration, may be seen to extend from ground surface 10 through overburden 18 eventually to and through sand 20. Although not illustrated in FIG. 1, borehole 14 would normally be filled with a fluid, such as drilling mud, in which logging is conducted. The preferred embodiment logging device of the present invention is shown disposed within borehole 14 adjacent to sand 20. This logging device is connected to a surface control panel and recorder by a conventional cable 12. The logging device shown in FIG. 1 comprises an upper body portion having an electronics section 100, below which is disposed a multidirectional, compressional (P) transmitter 102 and a point source (uni-directional), shear wave transmitter 104. The multidirectional transmitter 102 may be piezoelectric or magnetostrictive transmitter of the type known to the art for producing suitably recordable compressional waves. The preferred shear transmitter 104 is a bender type transmitter which is described in the above-identified, related patent application. Suspended below transmitters 102 and 104 are a series of spaced apart receivers 106-114. Each of these receivers is suspended on an acoustically isolating conduit 118, which may be of the rubber hose type described in the aforementioned Kitsunezaki paper. Receivers 106 and 108 are preferably shear type receivers also of the bender type, as described in the aforementioned related patent application. These receivers are characterized by their high sensitivity to shear (s) waves and their relatively low sensitivity to compressional and tube waves. In the preferred embodiment, shear wave receiver 106 is located about 4-6 feet, preferably about 5 feet, below shear wave transmitter 104, and shear wave receiver 108 is located approximately 2-5 feet below shear wave receiver 106. In this configuration, the distance between shear wave transmitter 104 and remote shear wave receiver 108 ranges from a minimum of about 6 to a maximum of about 11 feet.

Suspended below shear wave receivers 106 and 108 are a plurality of compressional wave receivers 110, 112 and 114. These compressional wave receivers may be of the conventional magnetostrictive or piezoelectric type, which are characterized by relatively high sensitivities to compressional and tube waves, and relatively lower sensitivities to shear waves. In the preferred embodiment, compressional wave receiver 110 is disposed at a distance of about 13-17 preferably 15 feet, from compressional transmitter 102. Second and third compressional receivers 112 and 114 are suspended below receiver 110 at spacings of about 4–6, preferably about 5, feet.

Figure 2:
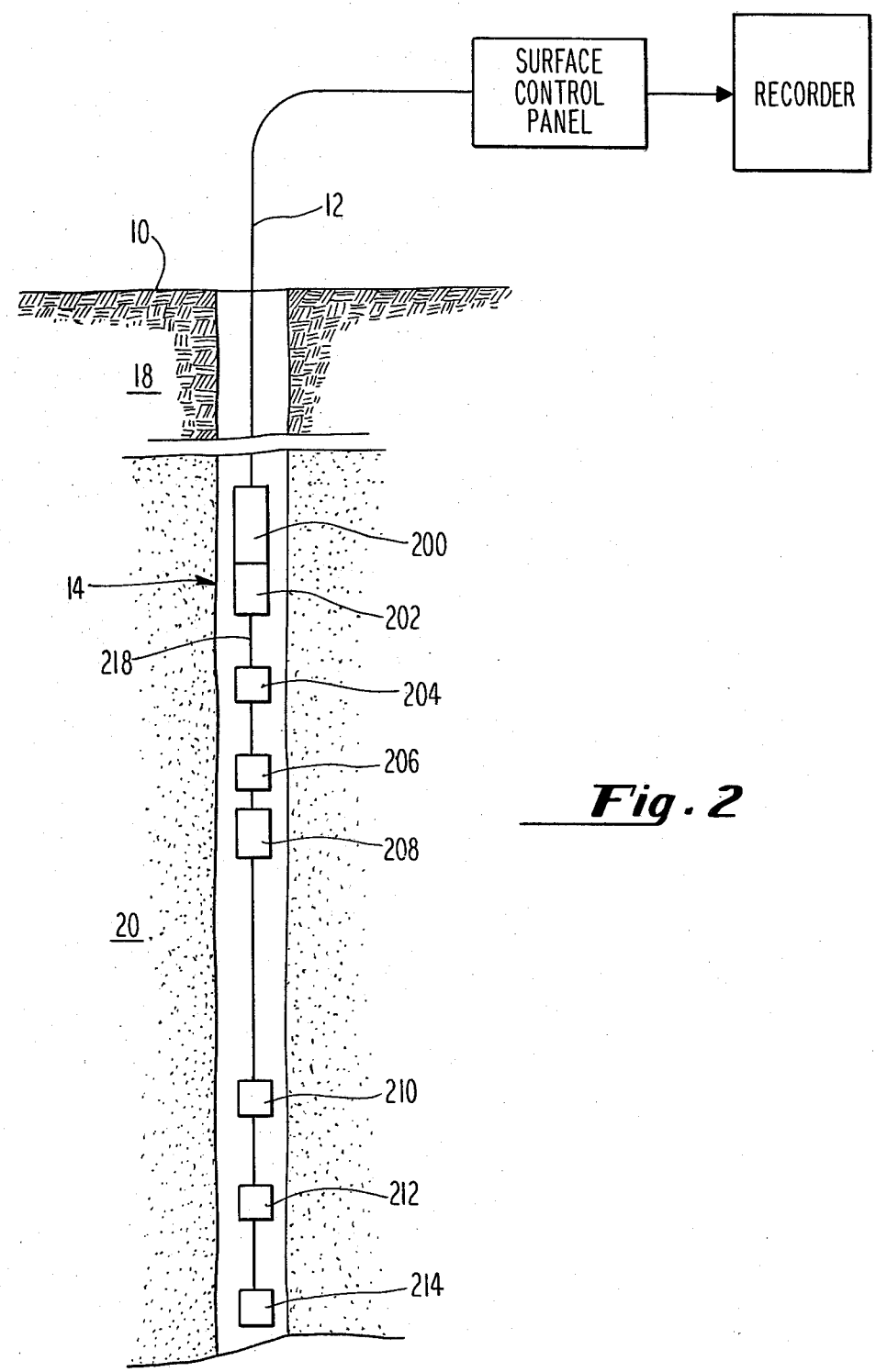
FIG. 2 is a diagramatic illustration similar to FIG. 1 showing an alternate embodiment logging device.

FIG. 2 is a diagramatic illustration similar to FIG. 1, showing an alternate embodiment device having a different juxtaposition of transmitters and receivers. Similar components in FIG. 2 have been numbered to correspond to the components described in FIG. 1, except with "200" series numbers instead of the "100" series number utilized in connection with FIG. 1. In this alternate embodiment logging device, the shear wave transmitter 202 has been separated from compressional wave transmitter 208 for the purpose of aiding in increased acoustic isolation. For purposes of sequencing, shear wave receivers 204 and 206 are still juxtaposed closer to compressional wave transmitter 208 than is any compressional wave receiver. Otherwise, the spacings between each transmitter and its respective receivers are as described in connection with the device of FIG. 1.

Figure 3:
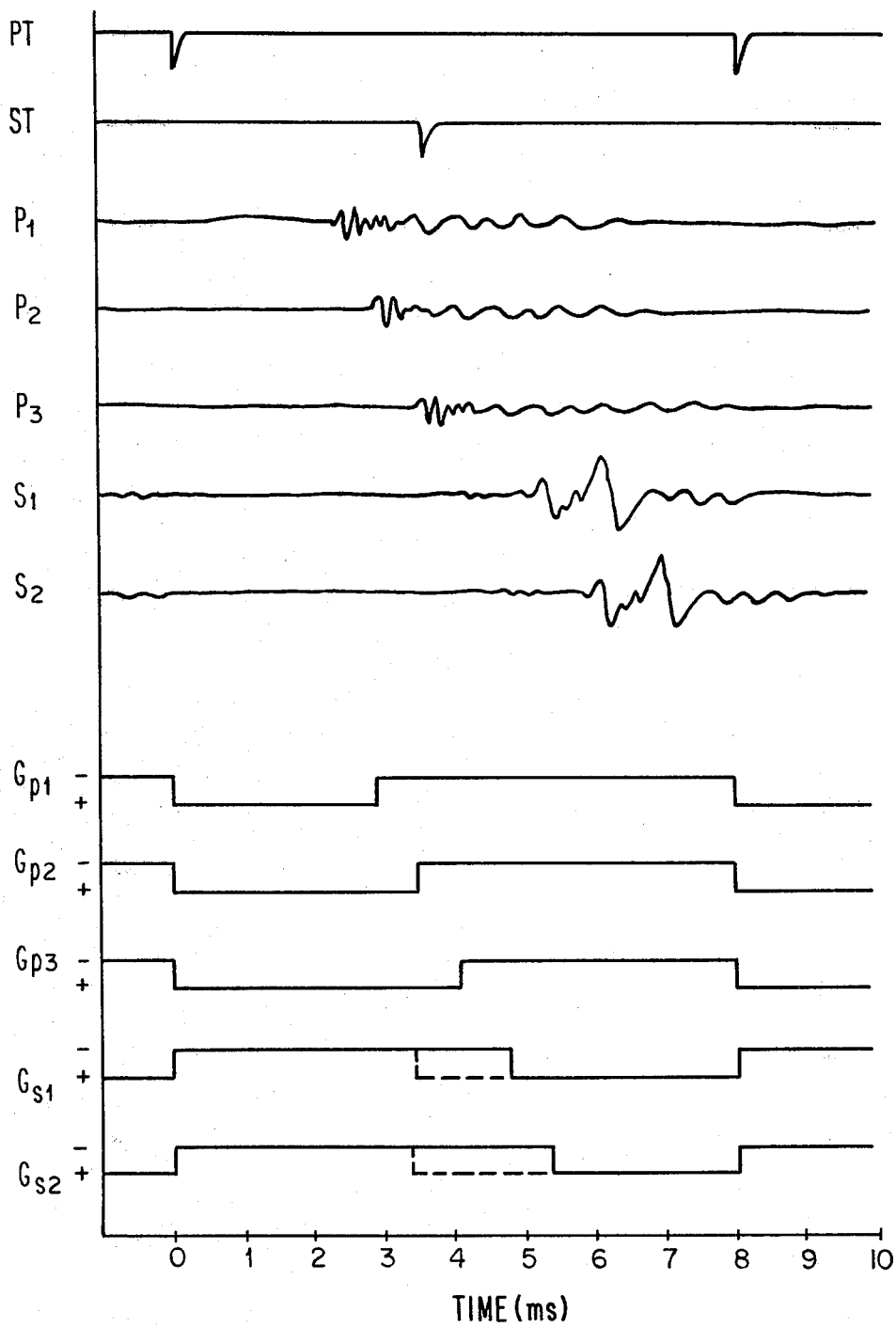
FIG. 3 is a diagram illustrating the preferred sequencing of the logging device illustrated in FIG. 1 showing, from the top, the energization of the compressional transmitter (PT) and the point source transmitter (ST), representative signals received by each of the compressional wave receivers ($P_1$, $P_2$ and $P_3$), representative signals received by the shear wave receivers ($S_1$ and $S_2$), and the preferred gating (G) for each of the aforementioned receivers, alternate gating modes being shown in dotted outline.

The preferred sequencing for the device illustrated in FIG. 1 is set forth in FIG. 3, which illustrates slightly more than one duty cycle of this preferred embodiment device. The signals indicated in each of the receiver traces of FIG. 3 are based upon experiments conducted in a loosely consolidated formation using shear and compressional waves generated within holes 10 feet apart at a depth of 20 feet. These signals have not been appropriately expanded or contracted as they would have been if generated by receivers located at distances of less than or greater than 10 feet. These signals are nonetheless generally representative of the signals which would be generated by the various receivers of the preferred embodiment device of FIG. 1. Similarly, the time scale of FIG. 3 is generally representative of the actual velocities of the waves recorded in the above mentioned experiments, but should not be interpreted as limiting the present invention to any particular fixed time sequence. As described hereinafter, the cycling frequency of the preferred embodiment logging tool preferably depends upon the velocities of the waves traveling through surrounding borehole formations.

The top trace (PT) is a trace showing the sequence of activation of the compressional wave transmitter 102. The next lower trace, ST, shows the sequence of activation of the shear wave transmitter 104. In reference to both FIGS. 1 and 3, upon energization of P wave transmitter 102 at time 0, as indicated by the spike in FIG. 3, a compressional wave will be generated which will travel through the surrounding sand formation past the shear wave transmitter 104 and shear wave receivers 106 and 108. This compressional wave is then received by compressional wave receivers 110, 112 and 114, which produce the receiver traces indicated in FIG. 3 as traces $P_1$, $P_2$ and $P_3$ respectively. In the preferred embodiment, each of these receivers is gated so that it will transmit its signals beginning from the time that the compressional wave transmitter is energized. The opening of this gating is indicated by the "+" condition of gating traces $G_{p1}$, $G_{p2}$ and $G_{p3}$.

Conventional signal analysis means is preferably utilized to ensure the receipt of the desired information relating to the compressional wave, as reflected in signal traces $P_1$, $P_2$ and $P_3$. Such signal analysis means may, for example "look" for a minimum amplitude of an arriving wave which will be presumed to be the compressional wave front. The time of receipt of this amplitude may then be used to calculate compressional wave velocity.

In the preferred embodiment, the shear transmitter 104 is activated in response to the receipt of a compressional wave signal by proximate compressional wave receiver 110, which generates trace $P_1$. In alternate embodiments, the receipt of other compressional wave signals, represented by traces $P_2$ or $P_3$, may be utilized to energize the shear wave transmitter 104. Less preferably, the shear wave transmitter 104 may be activated in time delayed response to the receipt of one of the aforementioned compressional waves, particularly in instances where high levels of acoustic noise have been encountered.

The particular location of the shear wave receivers 106 and 108 adjacent to the compressional wave transmitter 102 ensures that each compressional wave will have passed by receivers 106 and 108 prior to the activation of the shear wave transmitter. The gating for shear wave receivers 106 and 108 may permit the collection of data beginning immediately at the time of energization of the shear wave transmitter 104, as indicated by the dotted lines in FIG. 3, or may be delayed for a preselected interval to permit any minor compressional wave which may be generated by the shear transmitter to pass by each shear wave receiver prior to the beginning of shear wave data collection. In this latter instance, the solid lined gating arrangement illustrated in FIG. 3 for shear wave receiver 106 ($G_{s1}$) and 108 ($G_{s2}$) would be preferred. Such a time interval is easily calculated using recently collected information relating to compressional wave velocity. Such calculations should account for differential receiver spacings within the tool. Thus, the shear wave receiver gating delay time is simultaneously determined to account for compressional wave velocity variations.

Analysis of shear wave information (Traces $S_1$ and $S_2$) is conducted in accordance with conventional prior art procedures, which may be similar to the above referenced compressional wave analysis procedures. Once the receipt of a shear wave front is detected at compressional wave receivers 112 and 114, the compressional wave transmitter 102 may again be energized to restart the duty cycle. As shown by the gating traces in FIG. 3, the compressional wave receivers 110–114 will transmit information to the surface control panel while the shear wave receivers are deactivated, and vice versa.

Although the timings vary somewhat for the alternate embodiment device of FIG. 2, it should be appreciated that the positioning of the receivers and transmitters in the embodiment of FIG. 2 permits a cycling of this device in a signal receipt triggered manner similar to that described in connection with the embodiment of FIG. 1.

As seen from the above, the present apparatus and method for logging open boreholes in unconsolidated formations facilitate the rapid collection of high quality shear wave and compressional wave data relating to those formations. As such, the present invention represents a substantial improvement over prior art devices and methods.

What is claimed is:

1. A well logging device for continuously logging the shear and compressional wave transmission characteristics of materials located adjacent to a borehole; comprising:
   (a) a plurality of selectively activatable transmitters, said transmitters comprising at least a first multidirectional acoustic transmitter and a second point source acoustic transmitter;

(b) a plurality of receivers, at least one for each transducer, mounted on said device in spaced relation from said transmitters, said receivers comprising at least a first compressional wave receiver exhibiting a relatively greater sensitivity to acoustic waves produced by said first transmitter, and at least a second shear wave receiver exhibiting relatively greater sensitivity to acoustic waves produced by said second transmitter; and, (c) sequencing means for selectively energizing each of said transmitters in response to the detection of at least one wave by at least one of said receivers;

2. The apparatus of claim 1 wherein said point source transmitter is a bender type transmitter.

3. The apparatus of claim 2 wherein said second receiver is a bender type transducer.

4. The apparatus of claim 1 wherein said transmitters and said receivers are mounted on a single logging conduit.

5. The apparatus of claim 4 wherein the distance between said first transmitter and said first receiver is greater than the distance between said second transmitter and said second receiver.

6. The invention of claim 1 wherein said sequencing means at least energizes said second transmitter in in response to the detection of a compressional wave by said first receiver.

7. The invention of claim 1 wherein said sequencer means at least energizes said first transmitter in timed response to the detection of a shear wave by said second receiver.

8. The invention of claim 1 wherein said sequencer means sequentially energizes said second transmitter and said first receiver in response to the respective detection of a threshold signal at said first receiver and said second receiver.

9. The invention of claim 1 wherein said apparatus further comprises a gating means for selectively collecting data from each of said receivers.

10. The invention of claim 9 wherein said gating means permits the collection of information from said first receiver between the time of energization of said first transmitter to at least the time of receipt of a compressional wave by said first receiver.

11. The invention of claim 9 wherein said gating means permits the collection of information from said second receiver beginning at a time after the energization of said second transmitter through at least a time of receipt of a shear wave at said second receiver.

12. The invention of claim 1 wherein said first receiver comprises a plurality of spaced apart compressional wave receivers.

13. The invention of claim 1 wherein said at least one second receiver comprises a plurality of shear wave receivers.

14. The invention of claim 1 wherein each of said at least one second receivers is disposed between said first transmitter and its closest of said at least one first receiver.

15. The invention of claim 1 wherein said first transmitter and first receivers are disposed substantially adjacent to said second transmitter and adjacent to said at least one second receiver, said at least one second receiver being located closer to said first transmitter than any of said at least one first receivers is located to said first transmitter.

16. The invention of claim 15 wherein said second transmitter and second receivers are disposed substantially adjacent to and above said first transmitter.

17. A method for acoustically logging an open borehole disposed through poorly consolidated materials such as unconsolidated sands or coal overburdens, comprising the steps of:

(a) providing a logging device having a plurality of transmitters thereon, said transmitters comprising at least one point source type transmitter and at least one multidirectional compression wave type transmitter, said logging device further comprising a plurality of receivers disposed in spaced apart relation to said transmitters, said receivers comprising at least one shear wave type receiver showing increased sensitivity to waves produced in a borehole by said point source type transmitter, and a compressional wave type receiver showing relatively greater sensitivity to compressional waves produced by said compressional wave type transmitter;

(b) placing said logging device within said borehole to be logged;

(c) sequentially and periodically activating said transmitters to produce periodic shear and compressional waves within materials adjacent to said boreholes;

(d) sequentially permitting selected ones of said receivers to transmit information for collection to cause said shear wave receiver to receive and transmit information relating to said shear waves produced by said shear wave transmitter, and to cause said compressional wave receiver to receive and transmit information relating to said compressional waves produced by said compressional wave transmitter;

(e) recording said shear wave and compressional wave information transmitted from said receivers;

(f) moving said device through said borehole while periodically repeating steps a-e.

18. The method of claim 16 wherein information transmitted by said receivers alternatively activates each of said transmitters.

* * * * *